United States Patent
Seibert et al.

(10) Patent No.: US 10,376,842 B2
(45) Date of Patent: Aug. 13, 2019

(54) NON-DISPERSIVE OIL RECOVERY FROM OIL INDUSTRY LIQUID SOURCES

(71) Applicants: Board of Regents, The University of Texas System, Austin, TX (US); Organic Fuels Algae Technologies, LLC, Houston, TX (US)

(72) Inventors: Frank Seibert, Austin, TX (US); Stacy S. Truscott, Austin, TX (US); Stephen William Briggs, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 762 days.

(21) Appl. No.: 13/918,829

(22) Filed: Jun. 14, 2013

(65) Prior Publication Data

US 2013/0334137 A1    Dec. 19, 2013

Related U.S. Application Data

(60) Provisional application No. 61/659,776, filed on Jun. 14, 2012.

(51) Int. Cl.
| | |
|---|---|
| *B01D 61/58* | (2006.01) |
| *B01D 61/00* | (2006.01) |
| *C02F 9/00* | (2006.01) |
| *C02F 1/40* | (2006.01) |
| *C02F 1/44* | (2006.01) |

(Continued)

(52) U.S. Cl.
CPC .......... *B01D 61/58* (2013.01); *B01D 17/085* (2013.01); *B01D 61/00* (2013.01); *B01D 61/246* (2013.01); *C02F 9/00* (2013.01); *B01D 2311/04* (2013.01); *B01D 2311/2649* (2013.01); *B01D 2311/2676* (2013.01); *C02F 1/004* (2013.01); *C02F 1/385* (2013.01); *C02F 1/40* (2013.01);

(Continued)

(58) Field of Classification Search
None
See application file for complete search history.

(56) References Cited

U.S. PATENT DOCUMENTS

| | | |
|---|---|---|
| 2,611,490 A | 9/1952 | Robinson |
| 3,956,112 A | 5/1976 | Lee et al. |

(Continued)

FOREIGN PATENT DOCUMENTS

| | | |
|---|---|---|
| CA | 2248280 A1 | 10/1998 |
| EP | 0554567 A1 | 8/1993 |

(Continued)

OTHER PUBLICATIONS

Korean Intellectual Property Office (ISA) International Search Report and Written Opinion for PCT/US2013/046007, dated Oct. 11, 2013, 11 pages.

(Continued)

*Primary Examiner* — Jonathan M Peo
(74) *Attorney, Agent, or Firm* — Kilpatrick Townsend & Stockton LLP

(57) ABSTRACT

The present invention includes a method and system for separating oil from water and particulate contaminants from a oil/water/solid mixture, comprising: a solid removal system for removing small, medium and large solids from a oil/water/solid mixture to form a oil and water stream and a membrane contactor system for separating the oil from the water in the oil and water stream.

39 Claims, 4 Drawing Sheets

(51) Int. Cl.
*B01D 61/24* (2006.01)
*B01D 17/00* (2006.01)
*C02F 1/00* (2006.01)
*C02F 1/38* (2006.01)
*C02F 101/32* (2006.01)
*C02F 103/36* (2006.01)

(52) U.S. Cl.
CPC ............ *C02F 1/44* (2013.01); *C02F 2101/32* (2013.01); *C02F 2103/365* (2013.01); *C02F 2303/24* (2013.01)

(56) References Cited

U.S. PATENT DOCUMENTS

| | | | |
|---|---|---|---|
| 4,151,087 A * | 4/1979 | Sakaguchi | B01D 17/045 210/109 |
| 4,199,447 A * | 4/1980 | Chambers | B01D 17/045 210/638 |
| 4,309,289 A | 1/1982 | Head | |
| 4,439,629 A | 3/1984 | Ruegg | |
| 4,531,593 A | 7/1985 | Elliott et al. | |
| 4,814,088 A | 3/1989 | Kutowy et al. | |
| 4,846,976 A * | 7/1989 | Ford | B01D 17/00 210/195.2 |
| 4,846,978 A | 7/1989 | Leggett et al. | |
| 4,886,603 A | 12/1989 | Taylor | |
| 4,933,198 A | 6/1990 | Lee et al. | |
| 4,966,707 A | 10/1990 | Cussler et al. | |
| 5,069,926 A * | 12/1991 | Iwata | B05D 3/147 427/337 |
| 5,078,886 A | 1/1992 | Hsu | |
| 5,107,056 A | 4/1992 | Chen et al. | |
| 5,167,824 A | 12/1992 | Cohen et al. | |
| 5,236,474 A | 8/1993 | Schofield et al. | |
| 5,252,220 A | 10/1993 | Coughlin et al. | |
| 5,263,409 A | 11/1993 | Van Eikeren et al. | |
| 5,350,527 A * | 9/1994 | Kitko | B01D 17/00 210/109 |
| 5,378,369 A * | 1/1995 | Rose | A23D 9/007 210/637 |
| 5,397,369 A | 3/1995 | Ohishi | |
| 5,443,724 A * | 8/1995 | Williamson | B01D 17/045 210/295 |
| 5,639,375 A | 6/1997 | Hiroshi | |
| 5,779,889 A | 7/1998 | Sugiura | |
| 5,838,922 A | 11/1998 | Galand et al. | |
| 5,938,922 A | 8/1999 | Fulk, Jr. et al. | |
| 5,951,875 A | 9/1999 | Kanel et al. | |
| 5,954,858 A | 9/1999 | Peretti et al. | |
| 5,989,431 A | 11/1999 | Evans et al. | |
| 6,117,327 A | 9/2000 | Ciora et al. | |
| 6,146,535 A | 11/2000 | Sutherland | |
| 6,187,987 B1 | 2/2001 | Chin et al. | |
| 6,228,146 B1 | 5/2001 | Kuespert | |
| 6,436,290 B1 * | 8/2002 | Glassford | B01D 17/042 210/637 |
| 6,471,869 B1 | 10/2002 | Yanou et al. | |
| 6,471,969 B1 | 10/2002 | Schlachter et al. | |
| 6,920,637 B2 | 7/2005 | Mason et al. | |
| 7,186,344 B2 | 3/2007 | Hughes | |
| 8,092,685 B1 | 1/2012 | Gonzalez et al. | |
| 8,110,112 B2 | 2/2012 | Alburty et al. | |
| 8,128,827 B2 | 3/2012 | Gallo et al. | |
| 8,202,425 B2 | 6/2012 | Kale | |
| 8,366,794 B2 | 2/2013 | Tremblay et al. | |
| 8,455,669 B2 | 6/2013 | Miranda et al. | |
| 8,486,267 B2 | 7/2013 | Seibert et al. | |
| 8,491,792 B2 | 7/2013 | Kipp et al. | |
| 8,506,685 B2 | 8/2013 | Taylor et al. | |
| 8,523,981 B2 | 9/2013 | Huang et al. | |
| 9,149,772 B2 | 10/2015 | Seibert et al. | |
| 2003/0185956 A1 | 10/2003 | Gradley | |
| 2004/0200769 A1 | 10/2004 | Hunsinger | |
| 2004/0222156 A1 * | 11/2004 | Yu | B01D 17/0211 210/650 |
| 2004/0232046 A1 | 11/2004 | Tanaka et al. | |
| 2005/0098504 A1 | 5/2005 | Manz et al. | |
| 2005/0147757 A1 | 7/2005 | Roh et al. | |
| 2006/0191838 A1 | 8/2006 | Lowell | |
| 2006/0275533 A1 | 12/2006 | Fletcher et al. | |
| 2007/0144716 A1 | 6/2007 | Doh et al. | |
| 2008/0083671 A1 | 4/2008 | Bomberger et al. | |
| 2008/0156191 A1 | 7/2008 | Parekh et al. | |
| 2008/0156709 A1 * | 7/2008 | Johnson | B01D 17/0202 210/106 |
| 2009/0114609 A1 * | 5/2009 | Miller | B01D 17/0211 210/799 |
| 2009/0325269 A1 | 12/2009 | Marschke | |
| 2010/0028962 A1 * | 2/2010 | Hu | C12P 7/6463 435/134 |
| 2010/0151098 A1 | 6/2010 | Catchpole et al. | |
| 2010/0173806 A1 | 7/2010 | Fan et al. | |
| 2010/0297749 A1 * | 11/2010 | Aravanis | C12M 21/02 435/289.1 |
| 2011/0045528 A1 | 2/2011 | Dhamwichukorn | |
| 2011/0065940 A1 | 3/2011 | Kahelin et al. | |
| 2011/0138682 A1 | 6/2011 | Demaris et al. | |
| 2011/0167712 A1 | 7/2011 | Brasil | |
| 2011/0174734 A1 | 7/2011 | Seibert et al. | |
| 2011/0180475 A1 * | 7/2011 | Ahmadun | C02F 3/1263 210/628 |
| 2011/0192792 A1 | 8/2011 | Chew et al. | |
| 2011/0225878 A1 | 9/2011 | Moulijn et al. | |
| 2012/0077255 A1 | 3/2012 | Miranda et al. | |
| 2012/0094340 A1 | 4/2012 | Morgan | |
| 2012/0159839 A1 | 6/2012 | Koskinen et al. | |
| 2012/0208247 A1 | 8/2012 | Kipp et al. | |
| 2012/0226061 A1 | 9/2012 | Shepherd | |
| 2013/0270187 A1 | 10/2013 | Seibert et al. | |
| 2014/0131279 A1 | 5/2014 | Seibert et al. | |
| 2014/0243573 A1 | 8/2014 | Seibert et al. | |
| 2015/0087877 A1 | 3/2015 | Seibert et al. | |

FOREIGN PATENT DOCUMENTS

| | | |
|---|---|---|
| EP | 1270063 A2 | 1/2003 |
| EP | 1859852 A1 | 5/2007 |
| JP | 2007209955 A | 8/2007 |
| WO | 1998045019 A1 | 10/1998 |
| WO | 2001066910 A1 | 9/2001 |
| WO | 2005100542 A1 | 10/2005 |
| WO | 2009094440 A1 | 7/2009 |
| WO | 2011088242 A1 | 7/2011 |
| WO | 2013025260 A1 | 2/2013 |
| WO | 2013188837 A1 | 12/2013 |
| WO | 2013188849 A1 | 12/2013 |
| WO | 2014133619 A1 | 9/2014 |

OTHER PUBLICATIONS

Australian Patent Office (ISA) International Search Report and Written Opinion for PCT/US2013/073816, dated Mar. 13, 2014, 17 pages.
Machine Translation of Japan Patent Application Publ. No. 2007-209955—Takeo, Yoshida, (Aug. 23, 2007), Abstract, Description and Claims. 38 pp.
Machine translation of European Patent Publ. EP1859852A1 (Nov. 28, 2007) entitled "Removal of hydrophile substances from biodiesel using membranes" (abstract, description and claims)—15 pp.
European Patent Office, Extended European Search Report for European Patent Appl. No. 13803446.7 (PCT/US2013/046007) dated May 19, 2015. 7 pp.
European Patent Office, Extended European Search Report for European Patent Appl. No. 13804988.7 (PCT/US2013/046026 dated Jun. 17, 2015. 7 pp.
European Patent Office, Extended European Search Report for European Patent Appl. No. 11733393.0 (PCT/US2011021185) dated Sep. 16, 2015. 8 pp.

(56) References Cited

OTHER PUBLICATIONS

Korean Intellectual Patent Office (ISA)—International Search Report and Written Opinion for PCT/US2013/046026, dated Sep. 23, 2013, 13 pages.
European Patent Office, Extended European Search Report for EP 13876440.2 dated Jan. 26, 2016—8 pp.
Australian Patent Office (ISA International Search Report and Written Opinion for PCT/US2011/021185, dated Apr. 8, 2011, 21 pages.
Australian Patent Office (ISA) International Preliminary Report on Patentability for PCT/US2011/021185, dated Jul. 17, 2012, 13 pages.
Notice of Allowance dated Apr. 25, 2016, for Canadian Patent Application No. 2,874,775.

* cited by examiner

NON-DISPERSIVE OIL RECOVERY FROM OIL INDUSTRY LIQUID SOURCES

CROSS-REFERENCE TO RELATED APPLICATIONS

This application claims priority to U.S. Provisional Application Ser. No. 61/659,776 filed Jun. 14, 2012, the entire contents of which are incorporated herein by reference.

TECHNICAL FIELD OF THE INVENTION

The present invention relates in general to the industry of oil recovery and reclamation from oil industry liquid sources, and more particularly, to systems and methods for the recovery of oil from mixed liquid sources that may contain solids.

STATEMENT OF FEDERALLY FUNDED RESEARCH

None.

BACKGROUND OF THE INVENTION

Without limiting the scope of the invention, its background is described in connection with improved oil recovery and reclamation.

U.S. Pat. No. 3,956,112, issued to Lee, et al., is directed to a membrane solvent extraction. Briefly, this patent is said to describe a membrane solvent extraction system that is used to separate a dissolved solute from one liquid referred to as the carrier into a second liquid which is immiscible with the carrier and is referred to as the solvent. Therefore the hollow fiber membrane is used to extract a solute through a solvent swollen membrane from one solvent liquid phase to the extracting solvent liquid with direct contact between the liquid phases only within the porous walls. The membrane extraction method has potential advantages over conventional solvent extraction in that it does not require a density difference and provides a large amount of contact area. The membrane extraction contactor and may be applied to molecular diffusion based mass transfer separation processes as the mechanism in separation, purification, pollutant removal and recovery processes. This reference relies on liquid extraction, as the solvent swells the membrane filling the pores and providing a diffusional process to extract a dissolved solute from an immiscible liquid carrier.

U.S. Pat. No. 5,252,220, issued to Coughlin, et al., is directed to the preparation of analytical samples by liquid-liquid extraction using microporous hollow-fiber membranes. Briefly, this patent is said to teach a method and apparatus for accomplishing improved liquid-liquid extraction employing microporous hollow-fiber membranes. A number of modes of liquid-liquid extraction are possible according to the invention. As with the prior art, this patent relies on the interaction between two liquids, one of the contact side and one on the other side of the membrane for separation and concentration driving force diffusion of a dissolve solute across the liquid-liquid interface immobilized in the pore.

U.S. Pat. No. 6,436,290, issued to Glassford is directed to a method and apparatus for separating mixtures of organic and aqueous liquid phases. Briefly, this patent is said to include a method and apparatus for separating a mixture containing an aqueous liquid and an immiscible organic phase using microporous hollow fibers. Such mixtures are separated into a substantially organic-free aqueous phase and a substantially aqueous-free organic phase. The mixture is pressurized in a controlled low shear manner to minimize emulsification as it is contacted with the fibers. Productivity is said to be enhanced by separating as a third product stream, a further organic phase containing only small amounts of an aqueous phase, which for some applications can usefully be combined with the substantially aqueous-free organic phase.

U.S. Pat. No. 7,186,344, issued to Hughes is directed to a membrane-based fluid treatment system. Briefly, this patent teaches a process for removing soluble and insoluble inorganic, organic, and microbiological contaminants from a fluid stream employing a pretreatment module, a post-treatment module, a recycle stream module or any combination thereof, and a membrane module. The process reduces the problems associated with membrane fouling and increases contaminant removal capacity.

U.S. Pat. No. 8,128,827, issued to Gallo, et al., teaches a modular oil-based sludge separation and treatment system. Briefly, this patent discloses a method of recovering oil from oil-based sludge including the steps of homogenizing an oil-rich phase, a water-rich phase, and a solids-rich phase of an oil-based sludge, removing particulates from the oil-based sludge as the sludge traverses a shaker screen, heating the sludge, injecting a chemical into the heated sludge and mixing the chemical with the heated sludge, separating the phases of the chemically-treated sludge into a solids component stream, a water component stream, a first oil component stream, and a gas component stream, removing solids from the first oil component stream with a decanting centrifuge to form a second oil component stream, and removing water and solids from the second oil component stream with a disk stack centrifuge.

United States Patent Application Publication No. 2010/0173806, filed by Fan, et al., is directed to the extraction of hydrocarbons from hydrocarbon-containing materials and includes a method of extracting hydrocarbon-containing organic matter from a hydrocarbon-containing material includes the steps of providing a first liquid comprising a turpentine liquid; contacting the hydrocarbon-containing material with the turpentine liquid to form an extraction mixture; extracting the hydrocarbon material into the turpentine liquid; and separating the extracted hydrocarbon material from a residual material not extracted.

United States Patent Application Publication No. 2005/0098504 filed by Manz, et al., is directed to an oil and gas well fracturing (frac) water treatment process. Briefly, a novel process for treating and removing undesirable impurities from oil and gas well fracturing fluid is disclosed. For example, a method for treating fracturing water is taught comprising: (a) passing contaminated fracturing water containing solids and liquid through a mechanical separator to remove solids from the liquid; (b) treating the fracturing water liquid with an alkaline agent to increase the pH of the liquid to a level of above 9; (c) adding a coagulant to the fracturing water to form an agglomerate and separating the agglomerate from the fracturing water; (d) reducing the pH of the fracturing water of step (c) to a level of less than about 5.5; and (e) adding an oxidizing agent to the fracturing water of step (d) to oxidize oxidizable impurities in the fracturing water.

SUMMARY OF THE INVENTION

In one embodiment, the present invention is a system for separating oil from water and particulate contaminants from a oil/water/solid mixture, comprising: a solid removal system for removing small, medium and large solids from a oil/water/solid mixture to form a oil and water stream containing only solids small enough to pass into the contactor; and a membrane contactor system for separating the oil from the water in the oil and water stream, wherein the oil coalesces at a first surface of the membrane contactor and is collected at the second surface of the membrane contactor. In one aspect, the at least one of small, medium or large solids are removed with at least one of a sand filter, a rock filter, a porous ceramic material, a centrifuge, a mesh, a particulate filter, a sieve, a strainer or gravity. In another aspect, the at least one of small, medium or large solids are removed in the following sequence: large solids, medium solids and small solids. In another aspect, the oil/water/solid mixture is at least one of a oil industry liquid streams, oil contaminated water or brine, drilling mud, produced water, cells and/or cellular debris, and oil sands tailings. In another aspect, the oil/water/solid mixture is at least one of an oil industry liquid stream(s), oil contaminated water or brine, drilling mud, produced water and oil sands tailings. In another aspect, the oil/water/solid mixture processed is not subjected to gravity separation prior to processing. In another aspect, the oil/water/solid mixture processed is subjected to gravity separation prior to processing. In another aspect, the oil/water/solid mixture is at least one of a oil industry liquid streams, oil contaminated water or brine, drilling mud, produced water and oil sands tailings are processed by the system within 1, 2, 4, 6, 8, 12, 24, 26, 48 or 72 hours from removal of large solids. In another aspect, the membrane contactor is defined further as a hydrophobic membrane or membrane module that comprises hollow fiber microporous membranes. In another aspect, the hydrophobic hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof. In another aspect, the surface modified polymers comprise polymers modified chemically at one or more halogen groups by corona discharge or by ion embedding techniques. In another aspect, the oil separated from the water by the membrane contactor is mixed with a counterflowing solvent, wherein the at least one counterflowing solvent selected from non-polar solvents, alkanes such as hexane, aromatic solvents such as benzene, toluene, ethers such as diethyl ether, halogenated solvents such as chloroform, dichloromethane, and esters such as ethyl acetate. In another aspect, the wherein the counterflowing oil is oil recovered from a similar liquid source using the membrane contactor operated without a recovery fluid or by another method. In another aspect, the oil/water/solid mixture is from a bioreactor. In another aspect, the system further comprises a membrane cleaning system that removes debris that clogs the membrane contactor system and/or a detector that detects a clog of the membrane contactor system.

Another embodiment of the present invention is a method for removing oil from particulate and solid contaminants from a flowing stream of an oily-water and solid liquid mixture comprising the steps of: removing small, medium and large solids from a oil/water/solid mixture with a solid removal system to form a oil and water stream containing solids small enough to pass into the membrane contactor; and separating the oil from the water in the oil and water stream with a membrane contactor system in the presence of solids, wherein the oil coalesces at a first surface of the membrane contactor and is collected at the second surface of the membrane contactor. In one aspect, the at least one of small, medium or large solids are removed with a sand filter, a rock filter, a porous ceramic material, a centrifuge, a mesh, a particulate filter, a sieve, a strainer or gravity. In another aspect, the at least one of small, medium or large solids are removed in the following sequence: large solids, medium solids and small solids. In another aspect, the oil/water/solid mixture is at least one of an oil industry liquid streams, oil contaminated water or brine, drilling mud, produced water and oil sands tailings. In another aspect, the oil/water/solid mixture is at least one of a oil industry liquid stream, oil contaminated water or brine, drilling mud, produced water, cells and/or cellular debris, and oil sands tailings. In another aspect, the oil/water/solid mixture is not subjected to gravity separation prior to processing. In another aspect, the oil/water/solid mixture is at least one of a oil industry liquid streams, oil contaminated water or brine, drilling mud, produced water and oil sands tailings are processed by the system within 1, 2, 4, 6, 8, 12, 24, 26, 48 or 72 hours from extraction. In another aspect, the membrane contactor is defined further as a hydrophobic membrane or membrane module that comprises hollow fiber microporous membranes. In another aspect, the hydrophobic hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof. In another aspect, the e surface modified polymers comprise polymers modified chemically at one or more halogen groups by corona discharge or by ion embedding techniques. In another aspect, the oil separated from the water by the membrane contactor is mixed with a counterflowing solvent, wherein the at least one counterflowing solvent selected from non-polar solvents, alkanes such as hexane, aromatic solvents such as benzene, toluene, ethers such as diethyl ether, halogenated solvents such as chloroform, dichloromethane, and esters such as ethyl acetate. In another aspect, the counterflowing oil is oil recovered from a similar liquid source using the membrane contactor without a recovery fluid or by another method. In another aspect, the oil/water/solid mixture is from a bioreactor. In another aspect, the method further comprises the steps of removing a clog from the membrane contactor system. In another aspect, the method further comprises the steps of detecting a clog at the membrane contactor system.

Yet another embodiment of the present invention is a system for separating oil from water and particulate contaminants from a oil/water/solid mixture, comprising the steps of: removing at least one of small, medium or large solids from a oil/water/solid mixture to form a oil and water stream with at least one of a sand filter, a rock filter, a porous ceramic material, a centrifuge, a mesh, a particulate filter, or a sieve, strainer; and separating the oil from the water with a hollow fiber membrane contactor; and collecting the oil separated thereby, wherein the oil coalesces at a first surface of the membrane contactor and is collected at the second surface of the membrane contactor. In one aspect, the at least one of small, medium or large solids are removed with at least one of a sand filter, a rock filter, a porous ceramic material, a centrifuge, a mesh, a particulate filter, a sieve, or a strainer. In another aspect, the at least one of small, medium or large solids are removed in the following sequence: large solids, medium solids and small solids. In another aspect, the oil/water/solid mixture is at least one of a oil industry liquid streams, oil contaminated water or brine, drilling mud, produced water, cells and/or cellular debris, and oil sands tailings. In another aspect, the oil/water/solid mixture is at least one of an oil industry liquid streams, oil contaminated water or brine, drilling mud, produced water and oil sands tailings. In another aspect, the oil/water/solid mixture processed is not subjected to gravity separation prior to processing. In another aspect, the oil/water/solid mixture processed is subjected to gravity separation prior to processing. In another aspect, the oil/water/solid mixture is at least one of a oil industry liquid streams, oil contaminated water or brine, drilling mud, produced water and oil sands tailings are processed by the system within 1, 2, 4, 6, 8, 12, 24, 26, 48 or 72 hours from removal of large solids. In another aspect, the membrane contactor is defined further as a hydrophobic membrane or membrane module that comprises hollow fiber microporous membranes. In another aspect, the hydrophobic hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof. In another aspect, the surface modified polymers comprise polymers modified chemically at one or more halogen groups by corona discharge or by ion embedding techniques. In another aspect, the oil separated from the water by the membrane contactor is mixed with a counterflowing solvent, wherein the at least one counterflowing solvent selected from non-polar solvents, alkanes such as hexane, aromatic solvents such as benzene, toluene, ethers such as diethyl ether, halogenated solvents such as chloroform, dichloromethane, and esters such as ethyl acetate. In another aspect, the wherein the counterflowing oil is oil recovered from a similar liquid source using the membrane contactor operated without a recovery fluid or by another method. In another aspect, the oil/water/solid mixture is from a bioreactor. In another aspect, the system further comprises a membrane cleaning system that removes debris that clogs the membrane contactor system and/or a detector that detects a clog of the membrane contactor system.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
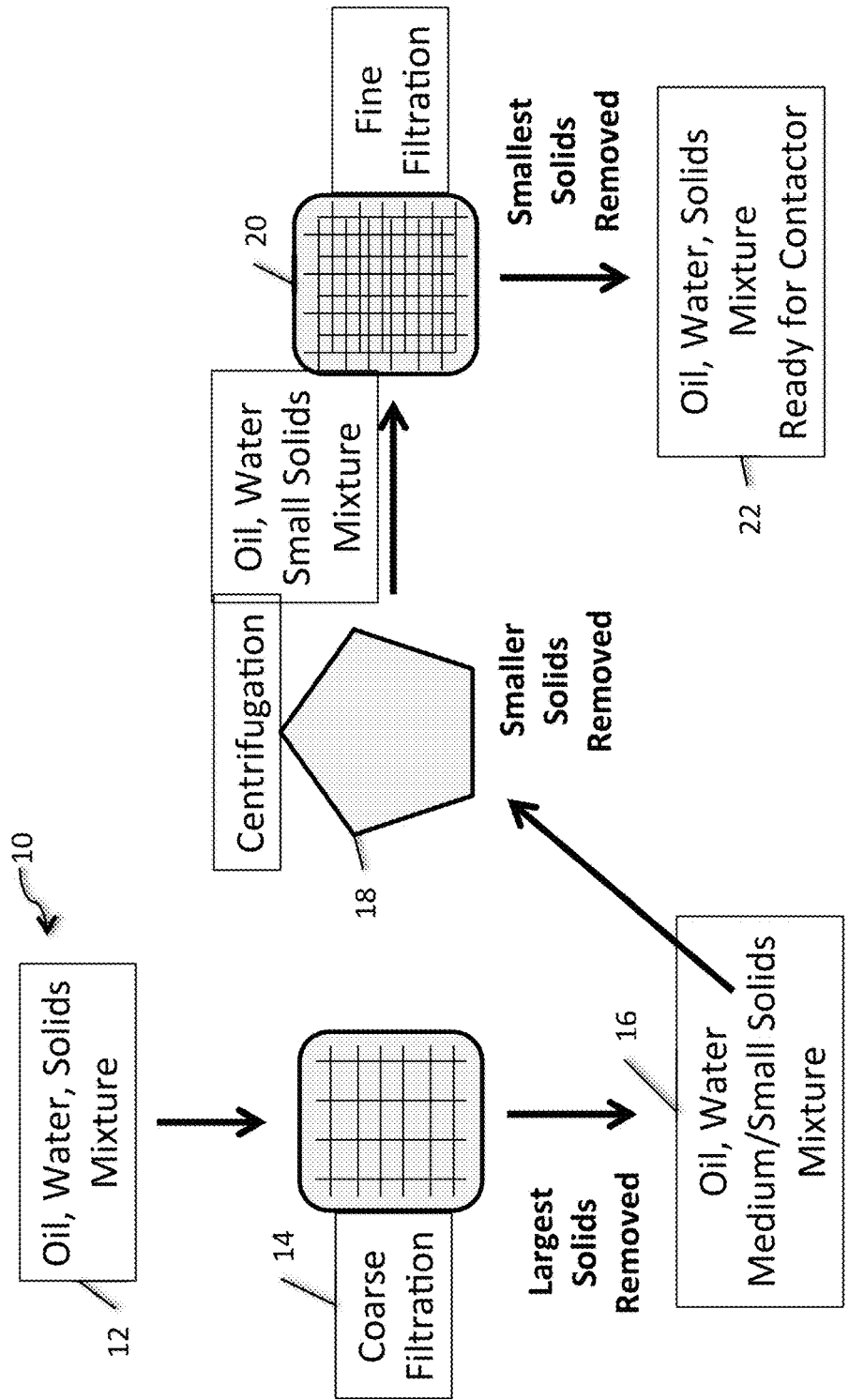
FIG. 1 shows the basic components of the enhanced oil recovery method and system of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The method of the present invention includes a process to recover oil from oil-rich sources containing high levels of solids, e.g., fluids produced from drilling that includes water, brine, sand, rocks and other non-hydrocarbon liquids and solids that comprise hydrocarbons that the user wants to recover or remove from the liquid. The process involves initial steps to remove physically large solids by gravity settling, filtration and/or centrifugation as non-limiting examples. These steps create a stream that has oil/water and physically small solids. The size restriction on the solids is required to complete the oil/water separation step. The oil/water separation step is accomplished by the previously disclosed non-dispersive contactor method.

The process allows oil recovery from liquid sources, non-limiting examples such oil industry wastes, oil contaminated water or brine, drilling mud, produced water and oil sands tailings. Currently, oil is recovered by skimming following gravity settling, combined with up-front filtration, centrifugation or the like. A non-oil dispersive membrane contactor is not currently used to promote more rapid or efficient oil recovery as it is believed to clog too easily. Surprisingly, the present inventors have found the system disclosed herein to provide robust, long-term separation of oil from mixed sources such as oil industry wastes, oil contaminated water or brine, drilling mud, produced water, oil sands tailings, oil from renewable sources such as bacteria, cyanobacteria, yeast, algae, plants, insects, and the like.

It was found by the present inventors that oil recovery using the non-dispersive contactor is faster, free of solids and less expensive than other techniques. The present invention overcomes the problem with a potential environmental hazard of long term settling ponds full of oily water. Further, oil removal from liquid sources makes subsequent processing steps on the water more cost effective or efficient and of course, the oil recovered can be sold.

As used herein the term "oil/water/solid mixture" encompasses water based liquids containing any of the following in any combination; insoluble oils (hydrocarbons and hydrocarbon-rich molecules of commercial value), rocks, sand, cells and/or cellular debris, insoluble particulates having diameters from, e.g., 100 nm to 1000 micrometers, water, brine, salts, gums, drilling fluids or muds, solvents (e.g., diesel). The slurry may also contain a solvent that was used to pre-treat cells to liberate compounds of interest.

The term "oil" as used herein refers to, e.g., hydrocarbon or hydrocarbon-rich molecules including a complex mixture of lipids, hydrocarbons, free fatty acids, triglycerides, aldehydes, etc. The compounds included herein may be from, e.g., $C_8$ (jet fuel compatible) up to $C_{60}$ (motor oil compatible) or larger.

The term "pumping" comprises all methods of pumping, propelling, or feeding fluid from one location to another employing hoses, lines, tubes ducts, pipes, or pipelines including under pressure. It also includes gravity flow of fluid.

The present invention describes a method for recovering oil from oil/water/solid mixtures using hydrophobic microporous hollow fiber membrane. The system can also include, but does not require a recovery fluid, which can be a hydrophobic liquid, a biodiesel, an oil or mixtures thereof. The use of a solid removal system and a hydrophobic microporous hollow fiber membrane provides a non-dispersive method of coalescing and recovering the oil without the need of gravity separation. A simple schematic representation of the method of the present invention is depicted in FIG. 1.

FIG. 1 shows the basic components of the enhanced oil recovery method and system of the present invention 10. A liquid and solid mixture 12, that may include oil, water, solids, sand, particulates, gums and other waste, is first passed through a coarse filtration system 14 that removes the largest solids from the liquid and solid mixture 12, to leave an oil, water, medium and small solids mixture 16. Next, centrifugation 18 is used to remove the medium solids to leave an oil, water and small solids mixture. The oil, water and small solids mixture is applied to a fine filtration system 20 that removes the smallest solids, such as coarse sand and fine sand, or any remaining medium and large solids (if any). The oil, water and particulates mixture that were not removed by the fine filtration system 20 are applied to a contactor system 22, that draws the oil from the oil, water and particulates mixture, which allows for further processing of the oil that can be removed, recaptured, or reprocessed and that leaves a stream of water and any particulates from which the oil has been removed.

Figure 2:
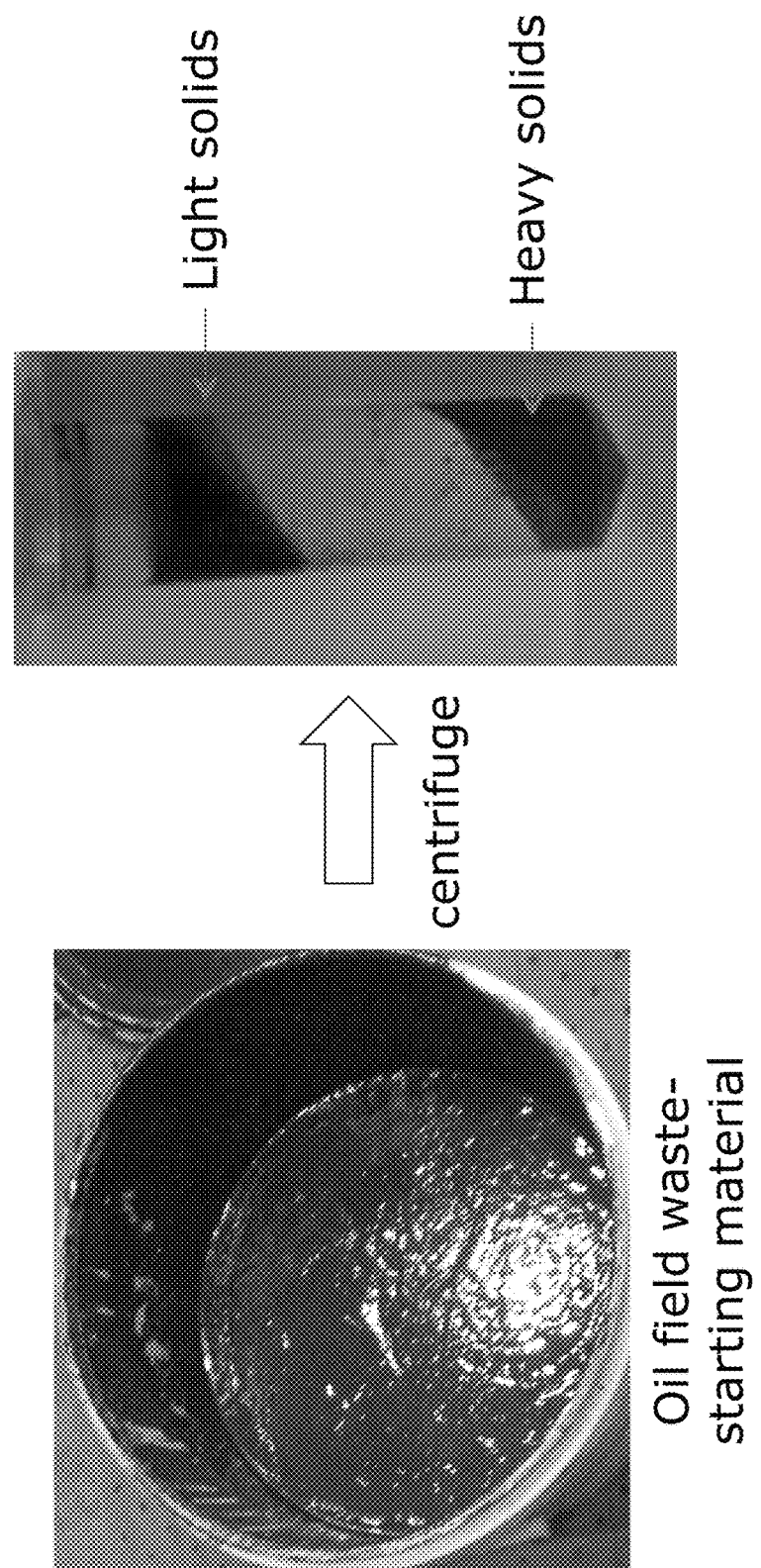
FIG. 2 shows the processing details and results from using the present invention.

FIG. 2 shows the processing details and results from using the present invention in which oil industry waste (e.g., starting material) was centrifuged to separate the heavy and the light solids. The heavy solids are shown at the bottom of the centrifugation, however, the light solids remained at the top of the tube.

Figure 3:
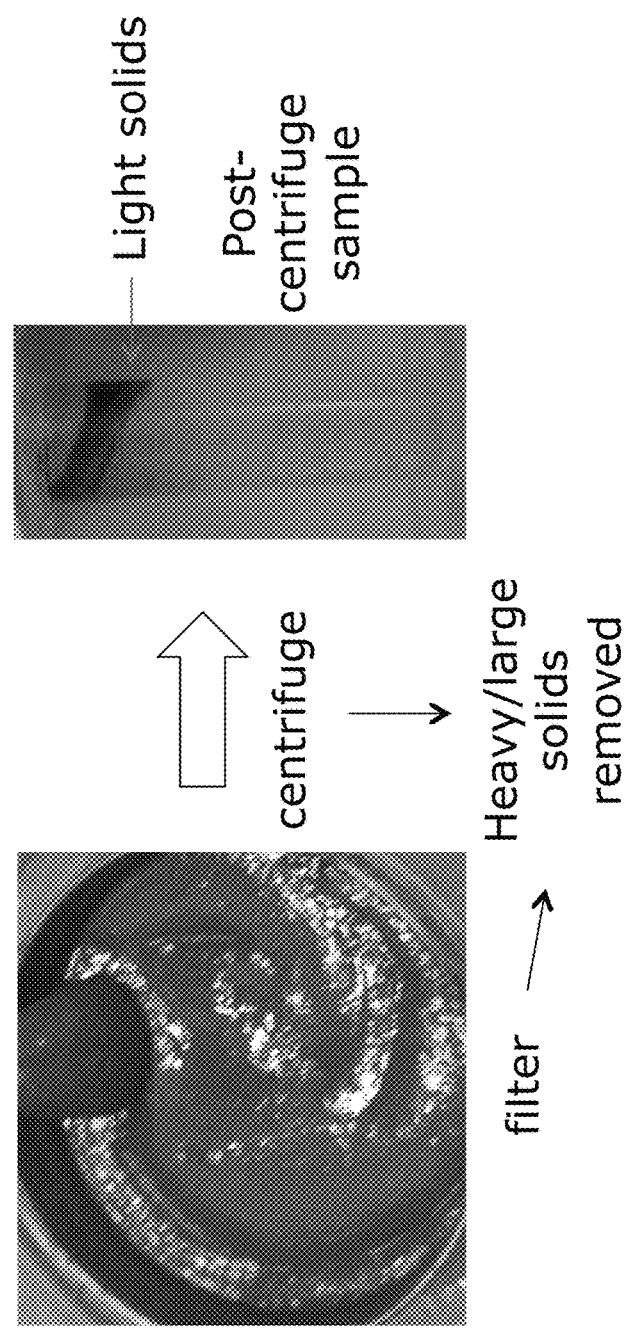
FIG. 3 shows more processing details and results from using the present invention.

FIG. 3 shows more processing details and results from using the present invention in which water is added to the oil industry waste (e.g., starting material) from which the heavy/large solids have been removed by using filters followed by centrifugation. Following centrifugation, the light solids, oil and water remain, which are then flowed into the contactor for isolation or removal of the oil.

Oil Industry Liquid stream Processing. Three 5-gal buckets of oil based drilling mud waste from different sources (e.g., A, B and C) are used. All three appeared to contain significant solids and appear very viscous. Each bucket contains approximately 4 gals. The material appeared to be made up of larger rocks and pebbles of varying sizes, some grasses, mud, oil, and water.

Preparation of Processing Material A. A 1 mL sample of each bucket was centrifuged and indicated that the material contained heavy and light solids. The heavy solids were more uniform in apparent composition in A, so this sample was prioritized to be processed first. A sieve screen was used to remove large particles. Fibrous material, possibly grass, was removed along with small gravel, sand etc. Approximately one gallon of material was removed. The filtered A material was filtered three times using a 40 micron filter and set up for testing using 2.5 inch by 8 inch Liqui-Cel X-50 module. Approximately one gal of A material is lost in the filtration.

In another example, two gals of original A material is added to one gal of distilled water and charged to feed tank. A feed rate of 100 lb/hr was used. After approximately 1-2 minutes, the flow through the membrane stops, due to the presence of solids that are too large to pass through the entry orifice of the module. In certain examples, the membrane is unblocked by repeated water flushing including flowing water in the opposite direction.

In another example, approximately two gallons of water was added to feed to dilute the material prior to centrifugation. The diluted material was pumped from a feed tank to the centrifuge. The feed was centrifuged (and can be centrifuged in multiple passes). Following centrifugation, the resulting A material looks very fluid-like. In one example, the centrifuged and diluted A material is filtered using a 10 micron filter.

In another example, approximately 3 gals of A material is charged to a feed tank. A shell side feed was mixed continuously in the feed tank. A pressure differential of between 23-25 psi was used. Pressure drop across the shell side was approx. 2 to 5 psi. Approximately 118 ml of oil recovered using 2.5 inch diameter membrane using a shell side rate=50-100 lb/hr, which included multiple complete passes with no signs of plugging or fouling.

The process for drilling mud may include: (1) course filtration to remove large particles (grass, gravel, sand etc.); (2) dilute with water (optional); (3) centrifuge to remove majority of remaining solids; (4) filtration to remove solids greater than 10, 20, 30 or 40 microns; and (5) feed the aqueous slurry on shell side of microporous hollow fiber membrane to recover oil on tube side.

The skilled artisan will recognize that some streams will either have no solids or solids that already meet the size selection criteria for processing (less than 10, 20, 30, 40 or 50 microns), so they may not need any pre-processing. If it is the case that some of the solids will stick to the membrane and cause a clog, a cleaning processes is used to remove the solids from the membrane to continue use. The present invention may also include a clog detector that determines if the membrane contactor system has become at least partially or fully clogged. Whether or not a clog is detected (e.g., if a clog detector is not used and rather a regular or sporadic cycle or maintenance is used), the invention may also include a system or method for cleaning the membrane contactor, e.g., physical-mechanical cleaning, use of chemicals, backflow, pressurized water, brine or other solvents or other methods for removing debris from the membrane contactor system. Thus, the present invention may also include one or more systems for cleaning, flushing and regenerating the membrane.

In certain examples, the streams may have been partially or completely gravity settled and/or may be predominantly oil with solids and comparatively small amounts of water. To separate the solids from the oil it may be necessary to apply pressure to the stream as it enters the solid removal system and/or the stream may have to be heated (in one example, steam is applied to the stream to both heat the stream and increase the water content).

It was found that the present invention can be operated with or without a counter-flowing recovery fluid. Therefore, the systems and methods can operate with or without a recovery fluid to recover the oil.

In other embodiments, the present invention can be used upstream from other oil-recovery or water polishing processes. The present invention can be used to pre-process oil-contaminated water prior to using other technology that reduces the level of hydrocarbons in the water to trace amounts. For example, using the present invention a drilling platform can process oil-contaminated water, so-called "dirty" water, that has been processed using the present invention prior to reuse of the water for, e.g., water flood or drilling operations. The present invention can be used to pre-process oil-contaminated water with a high oil content to reduce that oil content to, e.g., 500 ppm. Subsequent processing steps and technology can then be used to lower the oil content down into the 1 PPM range or less. By pre-processing the oil-contaminated water to a lower range of oil in ppm, water polishing technology that reduces the ppm of oil into acceptable ranges will have an improved half-life and will be able to process oil-contaminated water with a reduced oil load more effectively. One such technology for use following the use of the present invention, is a "smart sponge" technology to remove hydrocarbons from water, e.g., that developed by AbTech®. The AbTech® Smart Sponge can be used to polish the water to very low level of hydrocarbons, but the saturated smart sponges can then be burned to take advantage of the BTUs in the hydrocarbons.

Another such technology that can be used downstream from the present invention used produced water absorbents (PWA), such as OSorb®, that absorbs the oil from produced water streams. As with the smart sponges, the OSorb® technology can take the pre-processed oil-contaminated water from the present invention and then reduce the amount of hydrocarbons to very low levels. Again, by pre-processing the oil-contaminated water to a lower range of oil in ppm, the PWA technology that reduces the ppm of oil into acceptable ranges will have an improved half-life and will be able to process oil-contaminated water with a reduced oil load more effectively.

Figure 4:
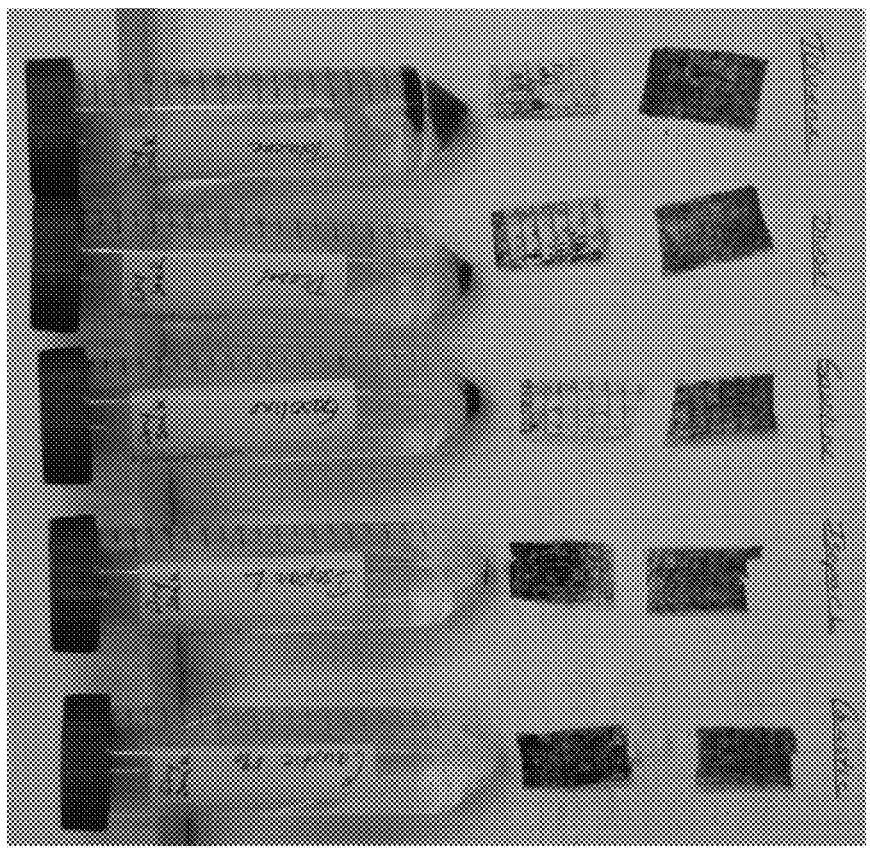
FIG. 4 shows the separation of solids and oil recovery using the present invention.

FIG. 4 shows the results from using the present invention on oil field samples. Briefly, following the separation, oil field solids were allowed to dry onto membrane fibers. Dried pieces of membrane were prepared and treated with various agents to identify agents that could remove the solids from the fibers. A strip of membrane was soaked for 10 minutes in, from left to right, 5% NaOH, Isopar L, gasoline, diesel and toluene. In each case, an untreated piece of membrane with dried solids is shown for comparison. The results show that caustic was ineffective in removing dried solids, while each of the hydrophobic liquids was able to remove dried solids. Gasoline, diesel and toluene were more effective than isopar L.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 8,128,827
U.S. Pat. No. 7,186,344
United States Patent Application No. 2010/0173806
United States Patent Application No. 2005/0098504

What is claimed is:

1. A system for separating oil from water and particulate contaminants in a mixture of the oil and the water and solids, comprising:

one or more solid removal systems for removing particular solids from the mixture greater than a threshold size to form an oil-contaminated water stream containing residual solids only smaller than the threshold size; and
a membrane contactor for separating the oil from the oil-contaminated water stream, wherein the membrane contactor has a shell side and a tube side, wherein the membrane contactor has a shell-side entry orifice for receiving the oil-contaminated water stream, wherein the membrane contactor generates a processed water stream having a reduced oil content and the residual solids, wherein the membrane contactor generates recovered oil on the tube side without needing gravity separation, wherein the membrane contactor comprises a hydrophobic membrane or membrane module, wherein the hydrophobic membrane or membrane module comprises a microporous hollow fiber membrane including hydrophobic microporous hollow fibers having a shell-side surface and a tube-side surface, wherein the oil coalesces onto the shell-side surface of the hydrophobic microporous hollow fibers in the presence of the residual solids and is collected at the tube-side surface of the hydrophobic microporous hollow fibers as the recovered oil, wherein the recovered oil collected at the tube-side surface is free of the residual solids, wherein the recovered oil collected at the tube-side surface is mixed with a counterflowing recovery fluid, and wherein the recovered oil collected at the tube-side surface is separated from the water from the oil-contaminated water stream.

2. The system of claim 1, wherein the one or more solid removal systems comprise one or more of a hydrocyclone, a sand filter, a rock filter, a porous ceramic material, a centrifuge, a mesh, a particulate filter, a sieve, a strainer, or gravity.

3. The system of claim 1, wherein the mixture comprises at least one of oil industry liquid streams, oil contaminated brine, drilling mud, produced water, cells, cellular debris, and oil sands tailings.

4. The system of claim 1, wherein the mixture comprises at least one of oil industry liquid streams, oil contaminated brine, drilling mud, produced water and oil sands tailings.

5. The system of claim 1, wherein the mixture is subjected to gravity separation.

6. The system of claim 1, wherein the mixture comprises at least one of oil industry liquid streams, oil contaminated brine, drilling mud, produced water and oil sands tailings that are within 1, 2, 4, 6, 8, 12, 24, 26, 48 or 72 hours from removal of the particular solids greater than the threshold size.

7. The system of claim 1, further comprising a water polishing system downstream of the membrane contactor for treating the processed water stream having the reduced oil content and the residual solids.

8. The system of claim 1, wherein the microporous hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof.

9. The system of claim 8, wherein the surface modified polymers comprise polymers modified chemically at one or more halogen groups by corona discharge or by ion embedding techniques.

10. The system of claim 1, wherein the counterflowing recovery fluid is selected from non-polar hydrophobic liquids, alkanes, hexane, aromatic solvents, benzene, toluene, ethers, diethyl ether, halogenated solvents, chloroform, dichloromethane, esters, and ethyl acetate.

11. The system of claim 10, wherein the counterflowing recovery fluid is oil recovered using the membrane contactor or by another method.

12. The system of claim 1, wherein the mixture comprises bioreactor effluent.

13. The system of claim 1, further comprising a membrane cleaning system that removes debris that clogs the membrane contactor.

14. The system of claim 1, further comprising a clog detector that detects a clog at the membrane contactor.

15. A method for removing oil from particulate and solid contaminants from a flowing mixture of the oil and water and solids, the method comprising:
removing particular solids from the flowing mixture greater than a threshold size with one or more solid removal systems to form an oil-contaminated water stream containing residual solids passing into a membrane contactor having a shell side and a tube side, wherein the membrane contactor comprises a hydrophobic membrane or membrane module, and wherein the hydrophobic membrane or membrane module comprises a microporous hollow fiber membrane including hydrophobic microporous hollow fibers;
flowing the oil-contaminated water stream into a shell-side entry orifice of the membrane contactor so that the oil-contaminated water stream contacts a shell-side surface of the hydrophobic microporous hollow fibers and droplets of oil present in the oil-contaminated water stream coalesce onto the shell-side surface of the hydrophobic microporous hollow fibers in the presence of the residual solids and, thereby generating a processed water stream having a reduced oil content and the residual solids;
collecting recovered oil at a tube side surface, wherein the recovered oil corresponds to oil coalesced from the oil-contaminated water stream at the shell-side surface of the hydrophobic microporous hollow fibers, wherein the recovered oil collected at the tube-side surface is free of the residual solids, wherein the recovered oil collected at the tube-side surface is mixed with a counterflowing recovery fluid, and wherein the recovered oil collected at the tube-side surface is removed from the water from the oil-contaminated water stream.

16. The method of claim 15, wherein the one or more solid removal systems comprise one or more of a hydrocyclone, a sand filter, a rock filter, a porous ceramic material, a centrifuge, a mesh, a particulate filter, a sieve, or a strainer.

17. The method of claim 15, wherein the flowing mixture comprises at least one of oil industry liquid streams, oil contaminated brine, drilling mud, produced water, oil sands tailings, cells, or cellular debris.

18. The method of claim 15, wherein the flowing mixture is at least one of oil industry liquid streams, oil contaminated brine, drilling mud, produced water and oil sands tailings that are flowed into the membrane contactor within 1, 2, 4, 6, 8, 12, 24, 26, 48 or 72 hours from extraction.

19. The method of claim 15, further comprising polishing the processed water stream having the reduced oil content and the residual solids.

20. The method of claim 15, wherein the microporous hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof.

21. The method of claim 20, wherein the surface modified polymers comprise polymers modified chemically at one or more halogen groups by corona discharge or by ion embedding techniques.

22. The method of claim 15, wherein the counterflowing recovery fluid is selected from non-polar hydrophobic liquids, alkanes, hexane, aromatic solvents, benzene, toluene, ethers, diethyl ether, halogenated solvents, chloroform, dichloromethane, esters, and ethyl acetate.

23. The method of claim 22, wherein the counterflowing recovery fluid is oil recovered using the membrane contactor or by another method.

24. The method of claim 15, wherein the flowing mixture comprises bioreactor effluent.

25. The method of claim 15, further comprising removing a clog from the membrane contactor.

26. The method of claim 15, further comprising detecting a clog at the membrane contactor.

27. A method for separating oil from water and particulate contaminants from a mixture of the oil and the water and solids, comprising:
removing particular solids greater than a threshold size from the mixture to form an oil-contaminated water stream having residual solids, wherein the removing includes using at least one of a hydrocyclone, a sand filter, a rock filter, a porous ceramic material, a centrifuge, a mesh, a particulate filter, a sieve, a strainer, or gravity;
flowing the oil-contaminated water stream into a shell-side entry orifice of a hollow fiber membrane contactor having a shell side and a tube side, wherein the hollow fiber membrane contactor comprises a hydrophobic membrane or membrane module, wherein the hydrophobic membrane or membrane module comprises a microporous hollow fiber membrane including hydrophobic microporous hollow fibers;
contacting a shell-side surface of the hydrophobic microporous hollow fibers with the oil-contaminated water stream so that droplets of oil present in the oil-contaminated water stream coalesce onto the shell-side surface of the hydrophobic microporous hollow fibers in the presence of the residual solids, thereby generating a processed water stream having a reduced oil content and the residual solids; and
collecting recovered oil on the tube side, wherein the recovered oil corresponds to coalesced oil from the oil-contaminated water stream that passes from the shell-side surface to a tube-side surface of the hydrophobic microporous hollow fibers in the presence of the residual solids, wherein the recovered oil collected at the tube-side surface is free of the residual solids, wherein the recovered oil collected at the tube-side surface is mixed with a counterflowing recovery fluid, and wherein the recovered oil collected at the tube-side surface is separated from the water from the oil-contaminated water stream.

28. The method of claim 27, wherein the removing includes using one or more of the hydrocyclone, the sand filter, the porous ceramic material, the centrifuge, and the mesh.

29. The method of claim 27, wherein the mixture comprises at least one of oil industry liquid streams, oil contaminated brine, drilling mud, produced water, cells, cellular debris, and oil sands tailings.

30. The method of claim 27, wherein the mixture is subjected to gravity separation.

31. The method of claim 27, wherein the mixture comprises at least one of oil industry liquid streams, oil contaminated brine, drilling mud, produced water and oil sands tailings, and wherein the mixture is subjected to the removing within 1, 2, 4, 6, 8, 12, 24, 26, 48 or 72 hours from extraction of the mixture.

32. The method of claim 27, further comprising polishing the processed water stream.

33. The method of claim 27, wherein the microporous hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof.

34. The method of claim 33, wherein the surface modified polymers comprise polymers modified chemically at one or more halogen groups by corona discharge or by ion embedding techniques.

35. The method of claim 27, wherein the counterflowing recovery fluid is selected from non-polar hydrophobic liquids, alkanes, hexane, aromatic solvents, benzene, toluene, ethers, diethyl ether, halogenated solvents, chloroform, dichloromethane, esters, and ethyl acetate.

36. The method of claim 35, wherein the counterflowing recovery fluid is oil recovered using the microporous hollow fiber membrane contactor or by another method.

37. The method of claim 27, wherein the mixture comprises bioreactor effluent.

38. The method of claim 27, further comprising removal of a clog from the microporous hollow fiber membrane contactor.

39. The method of claim 27, further comprising detecting a clog at the microporous hollow fiber membrane contactor.

* * * * *